June 2, 1970     W. H. CULVER     3,515,897
STIMULATED RAMAN PARAMETRIC AMPLIFIER
Filed April 21, 1967     3 Sheets-Sheet 1
FIG. 1
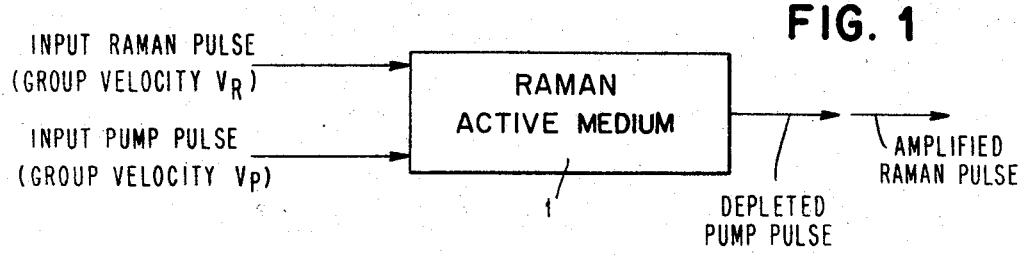
FIG. 2
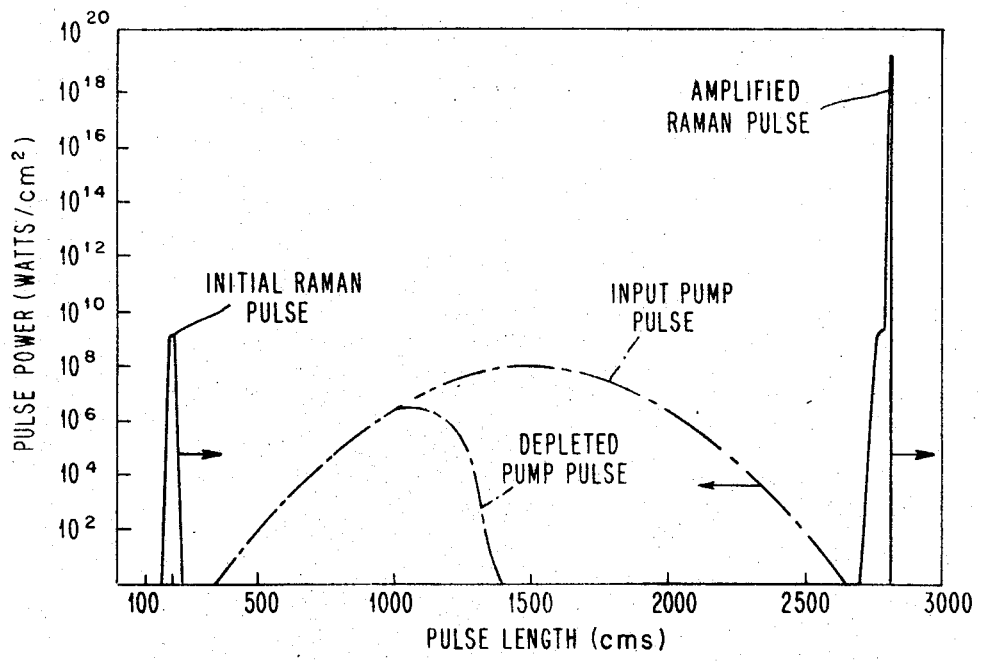
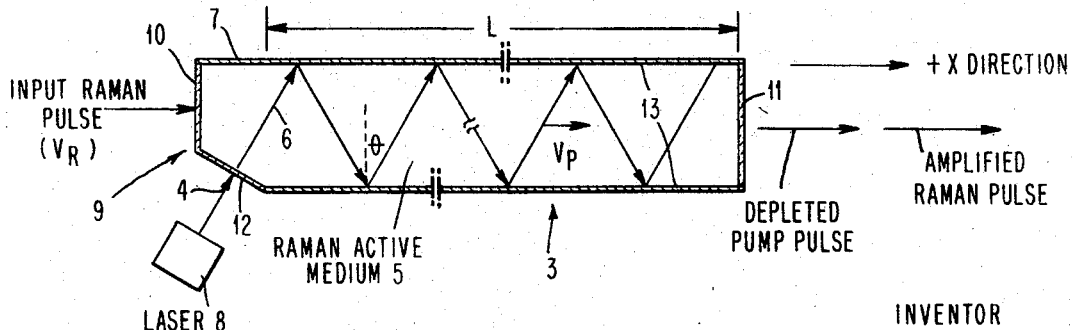
FIG. 3
INVENTOR
WILLIAM H. CULVER
BY *J. Tancin Jr.*
ATTORNEY

United States Patent Office

3,515,897
Patented June 2, 1970

3,515,897
STIMULATED RAMAN PARAMETRIC AMPLIFIER
William H. Culver, Washington, D.C., assignor to International Business Machines Corporation, Armonk, N.Y., a corporation of New York
Filed Apr. 21, 1967, Ser. No. 632,672
Int. Cl. H03f 7/00
U.S. Cl. 307—88.3        1 Claim

ABSTRACT OF THE DISCLOSURE

A Raman laser amplifier in which the pulse to be amplified passes through the pump pulse within the length of the interaction medium. The energy of the pump pulse is depleted and is deposited on either the leading or the trailing edge of the signal pulse, producing a high power, short duration pulse. In a special case thereof, a reverse-pumped Raman amplifier has laser pump radiation going in opposite direction to a Raman pulse which is to be amplified.

BACKGROUND OF THE INVENTION

This invention relates to laser amplifiers and more particularly to Raman laser amplifiers in which high power, short duration pulses are produced.

High intensity light beams are useful for many applications, such as radar and research in nonlinear optical effects. Previously, ruby lasers have been operated to produce pulses of approximately one millisecond duration. When operated in a Q-spoiled or giant pulse mode, these lasers have produced pulses of about 30 nanosecond duration. The gain of a solid-state, optically pumped laser operating as a generator of giant pulses is to some extent governed by the amount of population inversion that can be achieved and, generally speaking, there are a number of different mechanisms that act in competition with the pumping source, tending to de-excite the ions. Some of these mechanisms are spontaneous decay, the finite duration of the pumping process, and the occurrence of stimulated emission in highly regenerative internal modes, possibly involving total internal reflection. In order that ruby laser amplifiers have high gains, it is necessary that the reflectivity of the ends of the ruby rod be extremely small. Thus, to build a high gain amplifier, ruby laser rods are usually placed in series separated by some sort of isolator.

In cascaded laser amplifiers, the problems associated with inversion depletion due to amplification of spontaneous emission can be somewhat alleviated by the use of bleachable absorbers located between the laser stages. These absorbers have an effective reflectivity which is dependent on the power level of the input radiation. However, the peak intensities that can be obtained with these amplifiers is also limited by a number of effects, such as non-linear interactions or self-induced transparency of the laser medium.

Still another apparatus for generating short pulses is the mode-locked laser, which emits a train of pulses each of which has approximately $10^{-10}$–$10^{-12}$ seconds long. A modification of this involves the selection of a single mode-locked pulse from a Q-switched laser. Mode-locking is achieved by applying an amplitude modulation within the laser cavity at the frequency of the spacing of its longitudinal modes, or by using a bleachable dye in the cavity. Selection of a single pulse in this system is achieved by means of a pulse transmission mode, as described by A. A. Vuylsteke, J. Appl. Phys., vol. 34, p. 1615 (1963). Generally, the apparatus involved is very complex for this type of scheme.

A limitation of prior intense pulse sources is that the materials employed therein do not have sufficient high intensity beam handling capabilities, i.e., the beam propagation capabilities of these amplifiers are not adequate for handling extremely high power pulses.

Forward pumped Raman lasers have also been described. In these devices, power is transferred from one intense beam (pump—probably generated in a Q-spoiled laser) to another beam at the Raman frequency, which beam is traveling along the pump beam. Even in conventional forward pumped Raman amplifiers, the energy transferred to the Raman pulse is deposited throughout the width of the pulse thus limiting the amount of maximum output power.

Accordingly, it is a primary object of this invention to provide an improved Raman amplifier for providing very high power, short duration pulses.

Another object of this invention is to provide an improved Raman amplifier having high power conversion efficiency.

Still another object of this invention is to provide an improved Raman amplifier which is less costly than previously known sources of beams having comparable power and radiance (power per unit area per unit solid angle).

Another object of this invention is to provide an improved Raman amplifier which is easily and economically scalable to higher peak power and radiance.

A further object of this invention is to provide an amplifier having a maximum exchange of energy between the input pump radiation and the signal to be amplified.

A still further object of this invention is to provide an amplifier in which the pulses to be amplified are produced within the active medium itself, which pulses thereafter absorb a very high percentage of the energy of the pump pulse.

An additional object of this invention is to provide an improved Raman amplifier in which the signal pulse to be amplified is automatically synchronized with the pump pulse.

Another object of this invention is to provide an improved method for generating high intensity, short duration pulses wherein a maximum efficiency of energy conversion to the pulse to be amplified is obtained.

In order to more fully understand this invention a brief description of the Raman effect will be given. A Raman laser generally consists of an ordinary giant pulse laser, the beam of which is directed to pass through some suitable Raman active medium. This medium converts the primary beam (pump radiation) into radiation at frequencies which are displaced from that of the pump beam by the Raman shift of the medium. Frequency shifts are independent of incident radiation and are therefore characteristic of the particular material. This scattering of light with altered frequency is due to an exchange of energy between a quantum of pump radiation and the scattering particle according to the following expression:

$$\text{molecule} + h\nu \rightleftarrows \text{molecule}^* + h\nu'$$

The scattering particle can be a molecule of a gas or even a molecule aggregate such as a liquid or a crystal (here, the whole crystal lattice takes the place of the molecule). If $\nu' < \nu$, the molecule of the medium will be put in an excited condition. In the case of free molecules scattering light, there can be Raman effects such as: electronic effects in which there is an exchange of electronic energy between the molecule and the light quantum, vibrational effects in which vibrational energy is exchanged between the molecule and the incoming light quantum, and rotational effects in which there is an exchange of rotational energy between the molecule and the input light quantum.

This exchange of energy may be in either direction.

If the molecule gains in energy the emitted light then has a lower frequency than the incident light, and is termed Stokes Raman lines. The molecules which are initially in an excited state may lose energy, the emitted light then having a higher frequency than the incident light. These are termed anti-Stokes Raman lines. In general, more Stokes energy will be produced than anti-Stokes energy. The radiations of Raman lines emitted by different molecules are normally incoherent owing to the presence of arbitrarily varying phase factors.

The power levels of Q-switched lasers are now great enough that it is possible to observe not only spontaneous Raman emission but also stimulated Raman emission.

In stimulated Raman scattering, a medium having a number of energy levels A, B, C is irradiated by a beam of radiation of photon energy not equal to the difference in energy between the ground level A and any other level. This energy is not absorbed by any resonant levels because it is not the appropriate wavelength. However, there is some small probability that it will be scattered in the medium, giving out wave lengths which are radiated more or less isotropically. In this process the medium is excited to some other level, such as state B or C, etc. The energy difference between the incident and scattered radiation is the energy difference between the excited state and the ground state. The cross section per unit volume for this scattering process is very low, being of the order of $10^{-6}$ cm.$^{-1}$ for some of the more highly scattering Raman mediums, such as benzene. However, the probability for scattering into a particular mode is proportional to $(n+1)$, where $n$ is the number of photons per mode, in the mode into which the scattering occurs. For sources other than lasers, the scattering is very low, as $n$ is always much less than 1. If an intense laser beam is used as the pump source, the scattered beam, although still very much weaker than the original pump pulse, can be intense enough to make the photon density in the scattered mode approach 1 in value; this will increase the scattering into that mode and an essentially stimulated scattering process will occur. In return, more photons will be put into the scattering mode which will increase the cross section again. This is the effect of stimulated Raman scattering which gives rise to an exponential growth of a beam of light in a Raman active medium, which medium is illuminated by a sufficiently intense pumping source.

Quantitatively, a laser pulse of intensity $I_L$ traversing a Raman active medium will create a beam of radiation at the Raman-Stokes wavelength, which radiation builds up according to the relationship (1) $$\frac{dI_S}{d_X} = \alpha I_L (I_S + \Phi)$$

where:

$I_S$ is the power density of the Raman-Stokes beam $\alpha$ is a gain coefficient for a particular Raman active medium
$\Phi$ is the spontaneous emission at the Stokes wavelength.

If the growing Stokes beam is not large enough to appreciably deplete the laser pump beam, as is the case in conventional forward pumped Raman amplifiers, an exponential gain of the Stokes beam is obtained from Equation 1, i.e.

(2) $$I_S = \Phi(e^{\alpha I_L x} - 1)$$

If $e^{\alpha I_L x} \gg 1$, then $I_S$ has the following form:

(3) $$I_S = \Phi e^{\alpha I_L x}$$

Briefly stated, this invention is an oscillator-amplifier in which the pump radiation and the signal to be amplifier (Raman pulse) have components of their respective group velocities in the direction of the Raman pulse which are different in value. The amplifier cell is of such a length that the Raman pulse passes entirely through the pump pulse within the length of the Raman active medium. Hence, which energy is transferred from the pump pulse to the Raman pulse, which energy is deposited on either the leading or the trailing edge of the Raman pulse, depending on the relative group velocities of the two pulses. In this way, the pump pulse is completely depleted and a maximum efficiency of conversion of power to the Raman pulse is achieved. Because energy is transferred from the pump pulse to either the leading or trailing edge of the Raman pulse, pulse shortening is obtained and the output Raman pulse is a very intense, extremely short pulse.

A very simple means for achieving a complete pass of the Raman pulse through the pump pulse within the active medium, without requiring an extensively long active medium, involves passing the pump pulse and the Raman pulse to be amplified through the active medium in opposite directions. In this particular configuration, the length of the amplifier cell containing the Raman active medium is made-one-half the approximate length of the pump pulse. The reverse Raman pulse then emerges as a highly intense signal whose leading edge has absorbed a very high percentage of the energy of the input pump pulse. Because most of the energy of the pump pulse is absorbed in the leading edge of the Raman pulse, the trailing edge of the Raman pulse sees only a very small, depleted laser pulse. Therefore, pulse shortening occurs.

From the above, it is evident that this invention also contemplates a method of generating high intensity, short duration pulses in which, most generally, a Raman pulse and a pump pulse travel through a Raman active medium with different components of their respective group velocities in the same direction, for a sufficient amount of time that these pulses will pass entirely through one another before leaving the Raman active medium. In this way, a maximum amount of pump energy is transferred to an edge of the Raman pulse to be amplified.

The invention will be more fully understood by referring to the following detailed description taken in connection with the accompanying drawings forming a part thereof, in which:

FIG. 1 illustrates the broad concept of the subject invention wherein a pump pulse and a Raman signal pulse having different group velocities pass through one another within a Raman active medium.

FIG. 2 is a graphical illustration of solutions of the differential equations describing the amplification of the Raman pulse and the depletion of the laser pump pulse.

FIG. 3 is an illustration of a Raman amplifier according to the principles of the instant disclosure.

FIGS. 6a–d illustrate various amplifiers in which a Raman pulse is generated, which Raman pulse is automatically synchronized with the pump pulse.

Figure 7A:
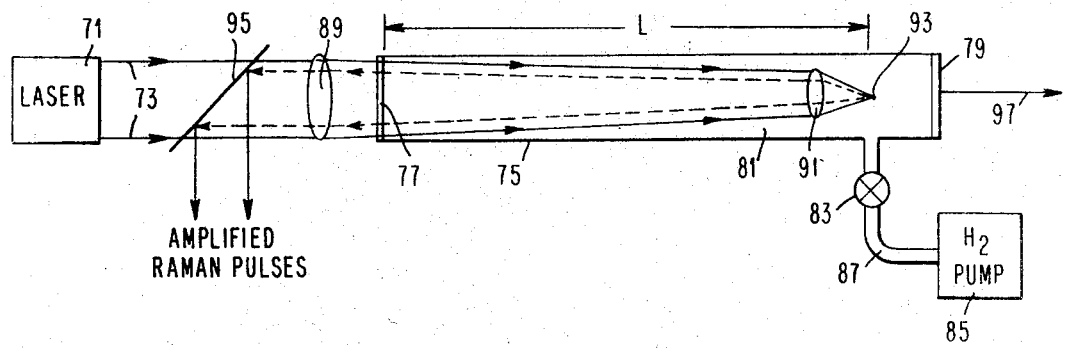

FIGS. 7a, b illustrate two embodiments of a reverse-pumped Raman amplifier, according to the principles of the subject invention.

Referring to FIG. 1, Raman active medium 1 is shown onto which is incident an input Raman pulse having group velocity $V_R$ (in the $x$ direction), and an input pump pulse having velocity $V_P \neq V_R$ (also in the $x$ direction). Both the input Raman pulse and the input pump pulse are produced by external sources (not shown) although, as will be seen later, the Raman pulse can be produced within the Raman active medium itself. The Raman pulse differs in frequency from the pump pulse by the Raman shift of the Raman active medium 1; any source which can produce a pulse of this frequency is suitable, such as a laser, etc. The pump pulse is generally produced by a laser capable of producing a giant pulse, such as a conventional Q-switched laser. The output pulses are the amplified Raman pulse and the depleted pump pulse. Because energy is transferred from the pump pulse to the Raman pulse, the output pump pulse will be largely deleted.

If the group velocity $V_R$ of the input Raman pulse is greater than the component of the group velocity $V_P$ of the pump pulse, along $V_R$, the input pump pulse is entered into the medium 1 before entry by the Raman pulse. The length of the Raman active medium 1 is so chosen that the input Raman pulse overtakes and passes totally through the pump pulse within the length of the Raman active medium 1. Hence, there is an extensive depletion of the pump pulse and a maximum efficiency for conversion of energy from the pump pulse to the Raman pulse. Energy from the pump pulse is deposited on the leading edge of the Raman pulse.

If, however, the component of the group velocity $V_P$ of the pump pulse along the direction $V_R$ is greater than $V_R$ of the Raman pulse, the Raman pulse must impinge upon the active medium 1 prior to incidence of the pump pulse. Various means are available for timing the incidence of these pulses into the active medium, such means being, for instance, any standard optical delay unit. The pump pulse then overtakes and passes through the Raman pulse, within the length of the medium. This transfers energy to the trailing edge of the Raman pulse.

In both of these cases, it is important that the edge (leading or trailing) of the Raman pulse be sufficiently abrupt. If it is not, pulse shortening will not occur. As with all amplifiers, the pulse to be amplified must rise faster than exponentially in order for pulse shortening to occur.

In order that the efficiency of energy conversion from the pump pulse to the Raman pulse be a maximum, the length of the Raman active medium 1 must be sufficient for the pump pulse and the Raman pulse to pass entirely through one another within the medium. For lengths of the active medium less than this, a smaller amount of energy will be transferred from the pump pulse to the Raman pulse, and only a portion of the pump pulse will be depleted.

The expression for the amplification of the Raman pulse is given by the following equation:

(4) $$\frac{dI_S(x,t)}{dx} = \alpha I_S(x,t) I_L(x,t)$$

where:

$I_S(x,t)$ is the Raman-Stokes power density,
$I_L(x,t)$ is the pump power density
$\alpha$ is the Raman-Stokes gain coefficient.

Except for a factor of the Raman-Stokes shift loss, $\beta$ the pump power is decreased by the same amount, that is, (5) $$\frac{dI_L(x,t)}{dx} = -\beta \alpha I_S(x,t) I_L(x,t)$$

Referring to FIG. 2, a representation of the solutions of these two differential equations is shown, which representation illustrates the transfer of energy from the input pump pulse to the leading edge of the Raman pulse.

Referring to FIG. 3, an embodiment for a forward pumped Raman amplifier is shown. In this embodiment, an amplifier cell, generally designated by the reference numeral 3, contains a Raman active medium 5, such as hydrogen gas. The actual cell 7 can be of any shape but is generally tubular. It has reflective inner walls 13. At both ends of the cell, there are transparent windows 9, 11. Window 9 admits the input Raman pulse from an external source, such as a Raman laser, for example, and the pump pulse 4, produced by the laser 8. Window 9 has two sections, designated as 10, 12 respectively. Window 11 is an exit port for both the amplified Raman pulse and the depleted pump pulse.

Control means are provided for controlling the group velocity of the pump pulse with respect to the corresponding component of group velocity of the Raman pulse to be amplified. In the amplifier of FIG. 3, the control means includes the reflective inner walls 13 of the cell 7. Because the laser pump beam 4 enters the cell 7 at an angle, the rays 6 of the pump beam will undergo a series of reflections from the reflective walls 13. Consequently, the group velocity $V_P$ of the pump pulse in the direction of the group velocity $V_R$ of the Raman pulse is different than $V_R$. In this particular case, $V_P$ is less than $V_R$. Therefore, the Raman pulse will pass entirely through the pump pulse within the length of the cell 7. Of course, the group velocity $V_R$ of the Raman pulse could be less than the group velocity $V_P$ of the pump pulse. The important thing is that the pump pulse and the Raman pulse pass through one another within the length of the active Raman medium.

Various means are available for controlling the relative group velocities of the Raman pulse and the pump pulse. In FIG. 3 the pump pulse 4 is incident on the reflective walls 13 at an angle so that it will be reflected therefrom. The laser axis need to be inclined to the longitudinal axis of the cell 7, as a reflector or prism could be used to reflect the pump pulse through the window section 12 so as to impinge upon the walls 13 at an angle. Further, the active medium could be such that the Raman pulse and the pump pulse would have different group velocities therein, due to their frequency differences. These means and many others are within the knowledge of those skilled in the art to which this invention pertains.

The length of the cell, L, is chosen so that the input Raman pulse passes entirely through the pump pulse before exiting from the cell 7. That is, once the angle of reflection $\theta$ is chosen, the length L is fixed so that the input Raman pulse will pass through the total pump pulse and will exit at the same time that the leading edge of the depleted pump pulse starts to exit. In more detail, the velocity of the input Raman pulse through the cell 7 is denoted by $c$, the velocity of light, while the velocity of the pump pulse in the positive $x$ direction is $V_P = c \sin \theta$. The time $t_R$ for the Raman pulse to traverse the cell 7 is $L/c$ while the time $t_P$ for the pump pulse to traverse the cell is $L/c \sin \theta$. In order to operate this amplifier, the pump pulse enters the cell 7 at $t=0$, while the Raman pulse enters the cell at a time $t = t_P - t_R$. At time $t_P$ both pulses emerge through window 11. In this particular case, since the velocity $V_R$ is greater than $V_P$, the energy of the pump pulse is transferred to the leading edge of the Raman pulse and a shortening of the Raman pulse occurs.

Figure 4:
FIG. 4 is a conceptual illustration of a reverse-pumped Raman amplifier according to the principles of the subject invention.

Referring to FIG. 4, a conceptual drawing of a reverse-pumped Raman amplifier is shown. Here the Raman pulse enters the active Raman medium from the left, while the pump pulse enters the active medium from the right. Transparent windows (not shown) are provided in the ends of the cell containing the Raman active medium for this purpose. If the length of the cell containing the active medium is made equal to one-half the approximate length of the pump pulse, then the Raman pulse will pass entirely through the pump pulse within the length of the Raman active medium. Therefore, there will be a maximum efficiency of conversion of energy from the pump pulse to the Raman pulse. Because the Raman pulse is moving in an opposite direction to the pump pulse, the amplified Raman pulse will have the energy of the pump pulse deposited on its leading edge. The trailing portion of the Raman pulse will see only a depleted pump pulse and will not be greatly amplified. Therefore, pulse shortening will occur.

The reverse pumped Raman amplifier is a preferable means for embodying the principles of the instant invention. In this embodiment, the cell length for maximum depletion of the pump pulse is a minimum, whereas in a forward pumped Raman amplifier, a longer cell is needed. This is necessary because it is more difficult to maximize the relative group velocity between the pump pulse and the Raman pulse, in the case of a forward pumped Raman amplifier. Consequently, a very long cell is needed in order that the Raman pulse pass completely through the pump pulse within the active medium.

Figure 5:
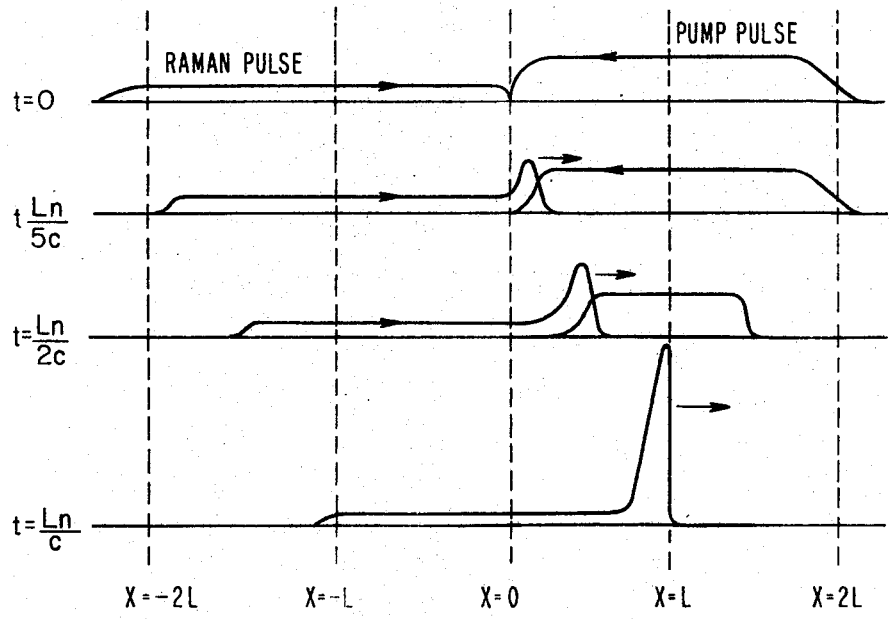
FIG. 5 is a graphical representation of the time-varying interaction of the reverse Raman-Stokes pulse and the pump pulse within the amplifier of FIG. 4.

FIG. 5 shows a time-based representation of the interaction between the Raman pulse and the pump pulse in the reverse pumped amplifier of FIG. 4. At time $t=0$, the pump pulse, which is of duration $2Ln/c$, is traveling in the $-x$ direction. Its leading edge is just leaving the end of the amplifier at $x=0$. Here, $n$ is the refractive index of the Raman scattering medium, L is the length of the amplifier, and $c$ is the velocity of light. The leading half of the pump pulse is contained within the amplifier while the trailing end of the pump pulse has not yet entered the amplifier.

At $t$ slightly greater than zero ($t=\Delta$), the leading edge of the Raman pulse enters the amplifier and is amplified according to Equation 4 above ($0<x<\Delta tc/n$). As the waves continue to propagate, the leading edge of the Raman pulse always encounters undiminished pump power and continues to grow exponentially according to the solution of Equation 4.

Most of the power in the pump pulse will be deposited in that portion of the leading edge of the Raman pulse containing an energy per unit area equal to $(\alpha\beta c)^{-1}$. As the amplitude of the leading edge of the Raman pulse increases, the width of the leading edge decreases and pulse shortening occurs. This phenomena continues until a high-powered, short pulse is obtained at the output of the amplifier.

Figure 6A:
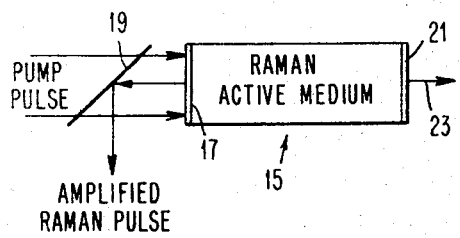
Figure 6B:
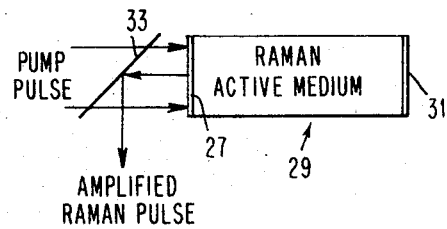
Figure 6C:
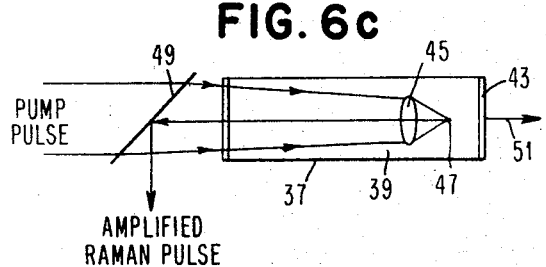

It is most convenient and efficient to produce the Raman pulse within the active medium itself. Specifically, it is desirable to use the self-generated reverse Raman-Stokes pulse as the pulse to be amplified, as this pulse will be traveling in a direction opposite to that of the pump pulse. FIGS. 6a–c illustrate four amplifiers in which the Raman pulse to be amplified is produced within the Raman active medium. In FIG. 6a, the input pump pulse passes through multi-layer reflector 19 and enters the amplifier 15 through window 17. For very low values of input power, only a very small amount of Raman radiation is produced. As the pump power increases, eventually there will be a large conversion of input power into forward Stokes pulses within the medium. At this point, very little reverse Stokes radiation will be produced. As the pump power is further increased, certain instabilities exist within the medium which cause it to generate backward traveling Stokes pulses, or reverse Stokes radiation. When one of these reverse Stokes pulses is produced, it will tend to grow and sweep out a portion of the input pump pulse. The amplified reverse Stokes pulse exits through window 17 and is reflected by reflector 19, which is opaque to the reverse Stokes radiation. The multi-layer reflector 19 is a means for removing the amplified reverse Stokes pulse from the amplifier. Other means, such as prisms, etc. could be used. Since the reflector 19 is located in the path of the pump pulse, it is transparent to the pump pulse but opaque to the reverse Stokes pulse. The forward Stokes pulses and the depleted pump pulse exit through window 21, as represented by arrow 23. The amount of energy which goes into the forward Stokes pulses as contrasted with that which goes into the reverse Stokes pulses is a very complicated function of the shape of the incoming pump pulses.

FIG. 6b shows another amplifier in which an automatically synchronized Raman pulse to be amplified is produced. It is most desirable to produce a Raman-Stokes pulse which alone can sweep out a maximum amount of energy from the input pump pulse. In FIG. 6b, the input pump pulse passes through multi-layer reflector 33 and window 27 before entering the amplifier cell 29. The far end of the cell is capped with a reflector 31. The input pump pulse produces a forward Stokes pulse which is reflected from the surface of reflector 31 and which then travels back through the amplifier cell 29. The power level of the input pump pulse is chosen so that the pump pulse will be almost depleted by the time it reaches the reflector 31. However, since the forward Stokes pulse is reflected from the surface of reflector 31 it travels back through the pump pulse, which has a considerable amount of energy left in it. Energy will be transferred from the pump pulse to the Raman pulse. Consequently, the amplified Raman pulse will be of high intensity and short duration and will exit through window 27, after which it is removed from the amplifier by the removal means 33, similarly to the device of FIG. 6a. Because the Raman-Stokes pulse is automatically synchronized with the pump pulse, it will deplete a considerable amount of energy therefrom and emerge as a high intensity pulse. As mentioned previously, the input power levels and the length of the amplifier cell are so chosen that the input pump pulse is not appreciably depleted before it gets to the reflector 31.

FIG. 6c illustrates another amplifier in which a self-generated Raman-Stokes pulse is automatically synchronized with the input pump pulse and can thus derive a maximum amount of energy from the pump pulse within a minimum distance. Here, the cell 37 contains a Raman active medium 39 and has an entrance window 41 and an exit window 43. Within the cell 37 there is present a lens 45 which converges the pump pulse to a focus at point 47. The input pump pulse will be convergent at the point 47 due to the lens 45 and therefore the power density at this point will be great. This will produce both forward and reverse Stokes pulses. The gain per unit length in the focus 47 is very great and, when the Stokes pulse begins to build up at the focus 47, the gain increases much more rapidly there than at any other point in the structure. Consequently, a very short pulse of Raman radiation will be sent out from the focus 47 near the leading edge of the pump pulse. This reverse Stokes pulse travels in a direction opposite to that of the pump pulse and will deplete the energy of the pump pulse. Consequently, an amplified Raman-Stokes pulse is obtained after reflection from reflector 49. As in the devices of FIGS. 6a, b, the reflector 49 is transparent to the pump pulse, and is the means for removing the amplified Stokes pulse. Forward Stokes radiation and the depleted pump pulse exit from window 43, as represented by arrow 51. This means is a very convenient one for producing a Stokes pulse which is synchronized with the leading edge of the input pump pulse, in a way which is not critically dependent upon the details of the temporal form of the pump pulse.

Figure 6D:
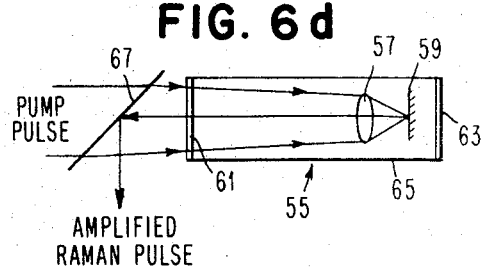

In FIG. 6d, the amplifier 55 contains a lens 57 and a reflecting surface 59 placed at the focus of the lens 57. Windows 61, 63 are located at both ends of the amplifier cell 65. The reflector 59 is located at a point of high concentration of energy and would probably survive only one input pump pulse before being destroyed. However, placement of a reflector 59 at this location insures an even more rapid build-up of the Raman-Stokes pulse in the reverse direction. This is so because the reflector 59 will not allow any forward Stokes pulses to be produced at the focus. The amplified reverse Stokes pulse exits from the amplifier 55 after reflection from the reflector 67. As above, reflector 67 is multi-layer element that is transparent to the input pump pulse, but opaque to the Raman pulse. It is the means for removing the amplified reverse Stokes pulse.

FIGS. 7a, b illustrate two reverse-pumped Raman amplifiers for producing high intensity, short duration output pulses. In FIG. 7a, a laser 71 supplies an input pump pulse of approximate length 2L, the rays of which are represented by arrows 73. The amplifier cell 75 has windows 77, 79 on both ends and is provided with a Raman active medium 81 through the valve 83. In this particular case the Raman active medium is hydrogen gas, although other media could also be employed. A pump 85 is utilized for supplying hydrogen through conduit 87. This pump is a means for adjusting the gain/length of the cell, since the pressure of the hydrogen gas in the cell 75 is varied by the pump. Control means are provided for controlling the location at which the pump pulse interacts with the Raman active medium to produce a reverse Stokes pulse. This control means also prevents the onset of spontaneous emission of forward Stokes pulses before the reverse Stokes pulse is produced. The control means used here is two lenses, the first 89 of which has a long focal length and is used to slowly converge the input pump pulse within the amplifier cell 75. The second lens 91 has a very short focal length and focuses the input pump pulse at a point 93. The lens 91 is displaced from the end window 79 so that a high concentration of energy will not be focused onto this window. A multi-layer reflector 95 is located in front of the amplifier cell 75, so as to reflect the amplified Raman-Stokes pulses out of the amplifier. However, reflector 95 is transparent to the input pump pulse produced by laser 71. This reflector 95 is a means for removing the amplified Raman-Stokes pulse out of the amplifier, as discussed previously, with respect to FIGS. 6a–d. The forward Stokes radiation and the depleted pump pulse exit through window 79, as represented by arrow 97.

The power density at the focal point 93 of lens 91 attains a value necessary for Stokes emission to occur in both the forward and backward direction. The Stokes radiation in the backward direction will encounter the remainder of the laser pulse and will be amplified and shortened in accordance with the pulse representation of FIG. 5. Because the pump pulse has been converged, the reverse Stokes pulse will see most of the pump pulse as it travels toward window 77. Very little of the pump pulse will go past the reverse Raman pulse without being absorbed by it. The reverse Stokes pulse will diverge as it moves to the left (opposite to the direction of the pump pulse) and will deplete the energy of the incoming pump pulse, finally leaving the amplifier cell through window 77 and being reflected out of the system by multi-layer reflector 95.

In order that spontaneous emission of Stokes pulses does not occur prior to the focal point of lens 91, the first lens 89 has a very long focal length and only slowly converges the input pump beam. Premature Stokes emission before the focal point 93 would cause a serious depletion of the pump pulse, as the premature Stokes pulse would absorb energy from the pump pulse before it had traveled the length L. Also, the pressures of the medium and the power levels of the input pump pulse are so chosen that the production of second reverse Stokes pulses by the first reverse Stokes pulse, is at a minimum.

Figure 7B:
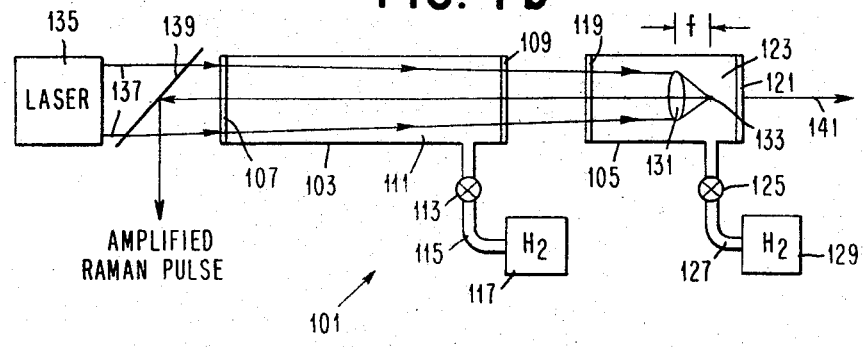

FIG. 7b shows another reverse pumped Raman amplifier. Here, the amplifier, generally represented by numeral 101, is broken down into two sections, 103, 105, the first section 103 being characterized by low gain and the second section 105 by high gain. The first section 103 has windows 107, 109 respectively on its ends and is provided with a Raman active medium 111 through valve 113 via conduit 115. In this case, hydrogen gas is the Raman medium and is provided by the pump 117. The high gain section 105 has windows 119, 121 respectively on its ends and is provided with a Raman active medium 123 through valve 125 by a conduit 127. Here again, the active medium is hydrogen gas which is supplied by the pump 129. A lens 131 is provided in the second section 105, which focuses the input laser beam at point 133. An equivalent to the long focal length lens 89 shown in FIG. 7a is omitted from the amplifier of FIG. 7b, but could be used, in conjunction with the lens 131, as a control means, in the manner set forth in the discussion with respect to FIG. 7a. However, since there is a separate hydrogen gas pump 117 for section 103, the pressure of the Raman active medium in this section can be kept low, so spontaneous emission of forward Stokes pulses is minimized. As in the amplifier of FIG. 7a, the lens 131 is so located that the input laser beam will not be focused on the exit window 121, in order that this window will not be destroyed. Multi-layer reflector 139 is transparent to the input pump pulse produced by laser 135, and serves as the means for removing the amplified reverse Stokes pulse from the amplifier.

The output of the laser 135 traverses section 103 and is focused into section 105. The laser pump pulse is represented by rays 137. By adjustment of the hydrogen gas pressure, Raman-Stokes generation is prevented prior to the focus of the lens 131. At the focus 133, substantial Raman-Stokes radiation is stimulated in both the forward and backward directions. The backward scattered Raman-Stokes radiation encounters the remainder of the laser pump pulse and is thereby amplified and shortened as previously discussed. To achieve the desired results, Raman-Stokes generation must be prevented prior to focal point 133. Premature Stokes emission in section 103 would cause depletion of the laser pulse prior to its interaction with the Stokes radiation emanating from section 105, and hence impair the Raman-Stokes amplification. The control means and the pumps 117, 129 serve this purpose.

The threshold for Raman-Stokes radiation can be arbitrarily defined as $I_S/I_L = 0.1$ which (from Equation 3) yields $$e^{\alpha I_L x} \geq \frac{0.1}{\Phi} I_L$$

Therefore, the largest $\alpha I_L x$ would require a small spontaneous noise term to prevent generation in section 103. The parameters $\alpha$, $I_L$ and $\Phi$ are adjustable; $x$ is determined by the pulse width of the laser. To achieve the highest amplification of the backward-traveling Raman-Stokes pulse, $\alpha I_L x$ should be as large as possible and yet small enough not to fulfill the threshold condition in section 103. The $\alpha$ and $\Phi$ depend on the Raman-Stokes linewidth in the following way:

$$\alpha = \frac{8\pi^2 \alpha_{12}{}^2}{\lambda s} \frac{N}{\Delta \nu}$$

where:
N is the density of molecules
$\lambda_s$ refers to the Stokes wavelength
$\Delta \nu$ is the Stokes line-width
$\alpha_{12}$ is the polarizability matrix element for the transition and
$\Phi = hc/\lambda_s{}^3 \Delta \nu dr$ $$\Phi = \frac{hc}{\lambda s^3} \Delta \nu dr$$

where $dr$ is the solid angle into which scattering occurs. The Raman-Stokes line width is a function of density or pressure. For the largest gain cross section and the smallest $\Phi$ it appears that the best region in which to operate is around a gas density of ten amagats. (An amagat, denoted by the Symbol A, is equal to $pv/(pv)_0$, where $(pv)_0$ is the pressure-volume product at 0° C. and one atm.).

If sections 103 and 105 are operated at different pressures, care must be taken to insure that the frequency of the output from section 105 falls within the Stokes linewidth in section 103.

Similarly to the operation of amplifier of FIG. 7a, the amplified reverse Stokes pulse exits through window 107, and is reflected by multi-layer reflector 139. The depleted pump pulse and the forward Raman-Stokes radiation exit through window 121, as represented by arrow 141.

In all embodiments shown, it is to be understood that the laser pump source can be a Q-switched laser or any other kind which is of sufficient intensity to provide spontaneous Raman-Stokes emission within the active medium. Thus, even a forward pumped Raman amplifier could be used as a pumping source for another amplifier. The Raman active medium can be either a solid, liquid or a gas, although there may be particular reasons why it is desirable to use gases. Although liquids appear more useful than gases because of their higher Raman gain coefficients, they must be operated at high power levels in order to obtain appreciable gain coefficients in reasonable lengths. At these high power levels, the beams become unstable and beam trapping occurs. This phenomena also occurs when a high intensity beam passing through a medium deforms the dielectric constant with a resultant breakdown of the beam into small filaments. The filamentary character of the beam accompanied by its lack of spatial coherence makes trapping media unattractive as materials for Raman amplifiers. The better high intensity beam propagation properties of gases seem to make them more suitable as choices for the Raman active material, although it is to be understood that both liquids and solids could be used.

While this invention has been described by specific embodiments, it is not to be limited thereto, for obvious modifications will occur to those skilled in the art without departing from the scope of this invention.

What is claimed is:

1. A Raman amplifier for generating a high intensity, short duration pulse comprising, in combination:
a source of an input pump pulse;
a cell containing a Raman active medium for scattering the pump pulse into a reverse Raman-Stokes pulse, the cell having a transparent window for admitting the pump pulse;
a pump attached to the cell for supplying the Raman active medium and for adjusting the gain/length of the cell;
a long focal length lens located between the source and the cell for gradually converging the pump pulse radiation in the cell, and to prevent the spontaneous emission of forward Raman-Stokes radiation;
a short focal length lens located within the cell and in the path of the converging pump pulse radiation for rapidly focusing the pulse at a point within the cell at which the pump pulse interacts with the Raman active medium to produce spontaneous emission of a reverse Raman-Stokes pulse, the Raman-Stokes pulse traveling through the input pump pulse, the Raman-Stokes pulse being amplified and shortened by the transfer of energy from the pump pulse to an edge of the Raman-Stokes pulse; and
a multilayer reflector for reflecting the Raman-Stokes pulse out of the amplifier, the reflector located between the source and the cell in the path of the Raman-Stokes pulse, the reflector being transparent to the pump pulse and opaque to the Raman-Stokes pulse.

References Cited

UNITED STATES PATENTS 3,300,653   1/1967   Boyd et al. _____ 307—88.3

OTHER REFERENCES

Brewer, "Applied Physics Letters," Oct. 1, 1964, pp. 127–128.

Bloembergen et al., "Physical Review Letters," May 4, 1964, pp. 504–506.

Maier, et al., "Physical Review Letters," Dec. 26, 1966, pp. 1275–1277.

ROY LAKE, Primary Examiner

D. R. HOSTETTER, Assistant Examiner

U.S. Cl. X.R.

330—4.5, 5, 53; 331—94.5; 321—69; 328—15, 53